June 21, 1966  A. H. YOUMANS  3,257,557
METHOD AND APPARATUS FOR IDENTIFYING THE
ELEMENTS IN THE FORMATIONS PENETRATED
BY A DRILL HOLE
Filed Sept. 20, 1960  2 Sheets-Sheet 1
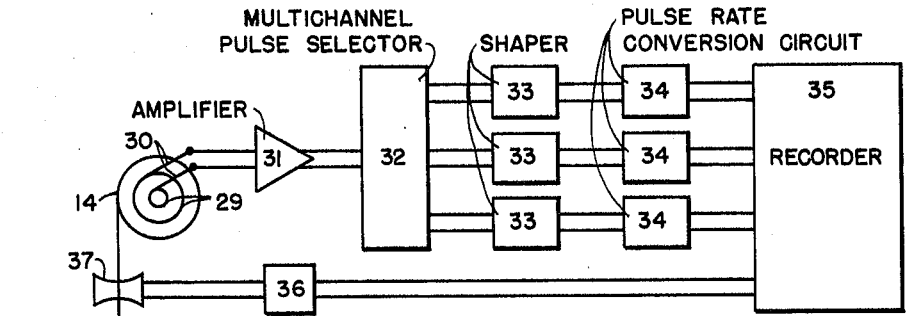
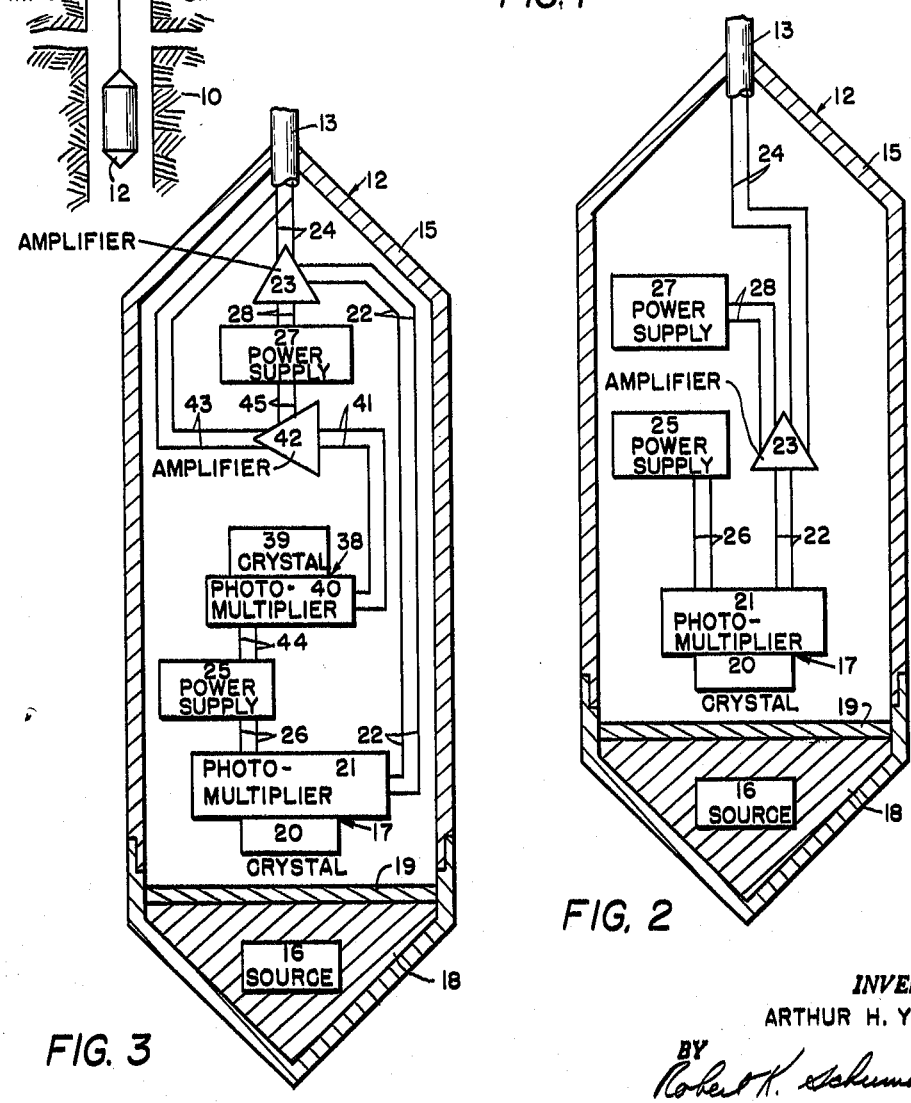
INVENTOR.
ARTHUR H. YOUMANS
BY
Robert K. Schumacher
ATTORNEY June 21, 1966  A. H. YOUMANS  3,257,557
METHOD AND APPARATUS FOR IDENTIFYING THE
ELEMENTS IN THE FORMATIONS PENETRATED
BY A DRILL HOLE
Filed Sept. 20, 1960  2 Sheets-Sheet 2
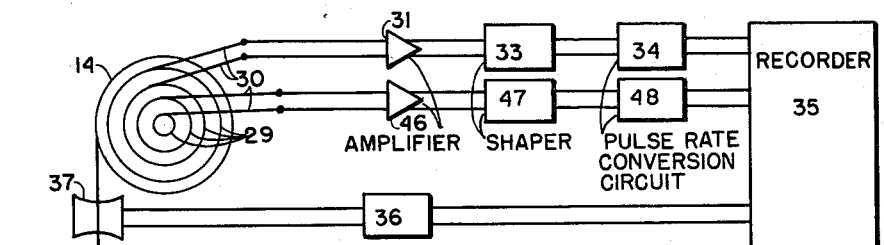
FIG. 4
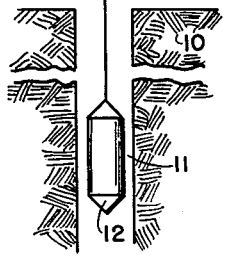
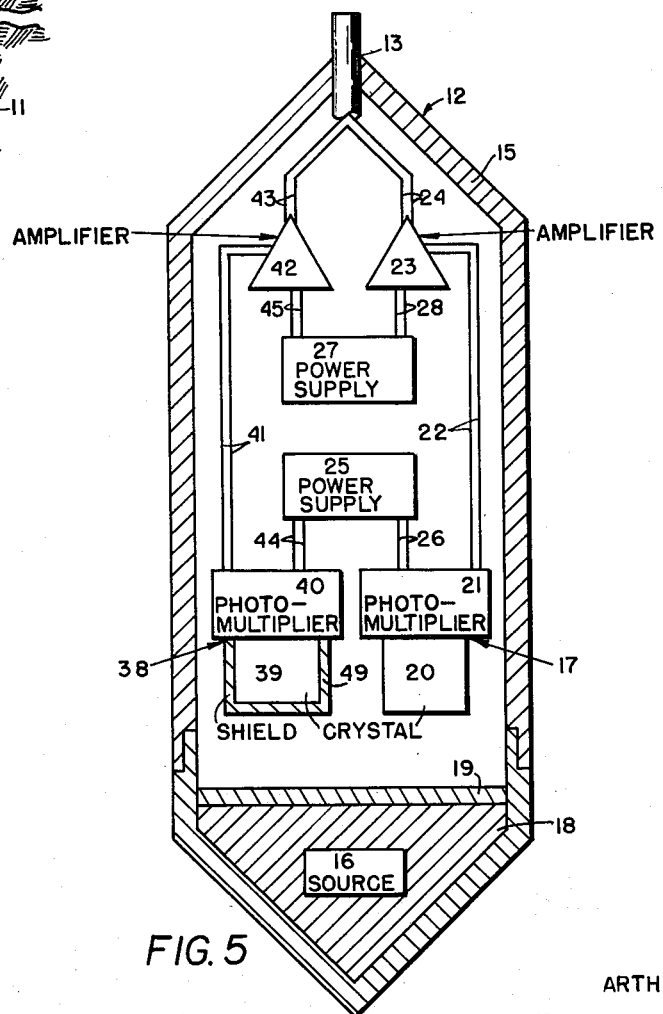
FIG. 5
*INVENTOR.*
ARTHUR H. YOUMANS
BY Robert K. Schumacher
*ATTORNEY*

United States Patent Office 3,257,557
Patented June 21, 1966

3,257,557
METHOD AND APPARATUS FOR IDENTIFYING THE ELEMENTS IN THE FORMATIONS PENETRATED BY A DRILL HOLE
Arthur H. Youmans, Tulsa, Okla., assignor, by mesne assignments, to Dresser Industries, Inc., Dallas, Tex., a corporation of Delaware
Filed Sept. 20, 1960, Ser. No. 57,304
7 Claims. (Cl. 250—83.3)

This invention relates to the art of geophysical prospecting and more particularly to the art of radioactivity well logging wherein gamma rays resulting from neutron capture or inelastic scattering are measured selectively and the spectral distribution of gamma rays is determined. This application is a continuation-in-part of the co-pending application of Arthur H. Youmans, Serial Number 243,230, filed August 23, 1951, entitled, Method and Apparatus for Identifying the Elements in the Formations Penetrated by a Drill Hole.

The purpose of well logging is to identify the composition of the formations of the earth surrounding a well. In particular, oil or oil bearing formations are sought to be identified. Every chemical element has specific and unique nuclear properties which may be measured; therefore, nuclear measurements in a borehole may be used to determine the atomic composition of material around the borehole. This invention is based upon the fact that every atomic nucleus possesses a unique scheme of energy states which may be excited by encounters with other particles. A nucleus so excited subsequently loses this excess energy by the emission of one or more gamma rays or by the emission of a particle or particles, or both. Where gamma rays are emitted, the quanta, in general, have energies corresponding to the excitation energy levels of the atom, or to differences between excitation energy levels. Thus, following nuclear excitation, an element which emits gamma rays always emits gamma rays which have an energy distribution characteristic of that element alone. By analysis of the gamma ray energy distribution, atomic composition of formations containing such elements may be determined.

Nearly every nucleus may capture thermal neutrons. When it does so, it generally becomes excited 6 to 10 m.e.v. above the normal ground state of the new nucleus formed by the fusion of the captured neutron with the original nucleus. The nuclei of the atoms of the formations may, therefore, be excited by slow neutron bombardment. However, not all isotopes readily capture neutrons. Carbon 12 and oxygen 16 are non-capturing isotopes, and their nuclei must be excited in a different manner. Excitation of these nuclei may be accomplished by bombardment with fast neutrons. When a high energy neutron strikes a nucleus, the neutron may be elastically scattered, it may be captured, or it may be inelastically scattered. Non-capturing elements such as carbon 12 and oxygen 16 become excited when they inelastically scatter high energy neutrons; inelastic scattering of a neutron may be considered equivalent to capture of the neutron and re-emission with energy lower than its original energy. The lost energy is given to the struck nucleus and results in excitation of the struck nucleus which will then emit gamma radiation characteristic of that particular nucleus. Excitation by the inelastic scattering of fast neutrons is possible for nearly every nucleus except protium and helium. Therefore, hydrogen and helium nuclei may be excited by slow neutron capture, carbon 12 and oxygen 16 nuclei may be excited by the inelastic scattering of neutrons, and most other nuclei may be excited by both methods. The method of exciting the nuclei will affect the gamma radiation emitted; for when excited by neutron capture, a nucleus becomes a different isotope; whereas when excited by inelastic scattering, a nucleus retains its original composition except that it is excited.

To use these principles in well logging, the elements in the formations may be excited by inelastic collision with fast neutrons emerging from a source of neutrons or by capture of neutrons which have diffused away from the source and gradually slowed down until they are captured. The radium-beryllium source of neutrons which is now employed in neutron well logging may be used as a source for this invention. Gamma rays resulting from the inelastic scattering of fast neutrons may be detected near the source. Non-capturing elements and elements that capture slow neutrons very poorly may be identified near the source; e.g., carbon, oxygen, silicon, and aluminum may be identified by detecting gamma rays of inelastic scattering near the source. Of course, gamma rays resulting from capture or inelastic scattering of neutrons by other elements will also be present. At some distance from the source, where few fast neutrons penetrate, capture processes will predominate, and the gamma rays which may be detected will be those arising from neutron capture by elements which readily capture slow neutrons, in particular, hydrogen, chlorine, iron, calcium, magnesium, potassium, sulphur, and titanium. This invention comprises a method and apparatus for detecting and classifying gamma rays according to energies so that relative atomic proportions may be deduced from the relative intensities of the gamma rays of different energies.

A scintillation counter is suitable for selectively detecting gamma rays of particular energies, for the output pulses of a scintillation counter may be directly proportional to the energies of the incident gamma rays. It is necessary that the electrons produced by the gamma rays be completely stopped in the detector and that for each scintillation the same fraction of light reach the photocathode in order for each pulse to have energy proportional to the energy of the incident gamma rays giving rise to said pulse. The scintillation counter may have a crystal scintillation medium on which gamma radiation from the strata impinges. Impinging gamma rays may suffer Compton scattering, may produce a photoelectron or may react to form a positron-electron pair. In either of the latter two cases a discrete amount of energy will be imparted to the crystal provided the secondary electrons do not escape. Thus, if a monoenergetic beam of gamma rays were to traverse the crystal, a distribution of pulse energies would appear in the output of the scintillation counter. This distribution would contain a triad of peaks, one corresponding to the largest pulses being due to the stopping of a gamma ray by the photoelectric effect, another due to pair formation, and a broad flat peak due to Compton scattering. The sharp peaks due to the first two processes indicate the energy of the gamma rays. If the radiation is polychromatic, as it is in well logging, a complicated spectrum will result, but where particular gamma ray energies are predominant, corresponding peaks will occur in the pulse height distribution. Separate measurements of the counting rate for pulses corresponding in height to these peaks comprise logs indicative of the relative atomic proportions of the elements characterized by the gamma rays producing them. Since the capture cross-sections and scattering cross-sections are different for each element, the logs must be adjusted according to the relative cross-sections in order to make the counting rates directly indicative of atomic proportions.

In well logging according to this invention, the electrical pulses from the scintillation counter are transmitted to the surface of the earth and there separated according to their height by a pulse selector which passes pulses of particular heights into separate channels. Since pulses of a particular height are indicative of a particular element, by proper adjustment of the pulse selector the pulses in each channel may be made indicative of a particular element. Since the gamma-ray spectrum likely to be encountered in well logging is complicated, peaks will overlap in the pulse height distribution and will be difficult to distinguish from one another; also there will be smearing of the peaks resulting from scattering of gamma rays in the strata, borehole, and instrument casing prior to detection. Compton scattering in the detector will provide further background which may obscure the peaks. Because of the difficulty in identifying the peaks, a multiplicity of detectors may be desirable. In particular, two detectors, one near the source and one distant, is desirable. The detector near to the source could be used for the detection of carbon, oxygen, or other non-capturing material; for near the source fast neutrons will be inelastically scattered, and gamma rays due to the inelastic scattering will be detected. At the distant detector there are few fast neutrons, and the gamma rays detected will be those due to slow neutron capture. The remote detector supplies information concerning capturing material particularly hydrogen, chlorine, calcium, and magnesium. Comparison of the gamma-ray spectra detected by the two detectors provides more information than one spectrum alone, for the effects of inelastic scattering and neutron capture may be isolated and, therefore, will not obscure each other. It is also desirable to include a neutron sensitive detector at the distant detector to detect neutron flux density so that the log made by the distant detector may be interpreted quantitatively and not be dependent upon neutron flux density.

It is not necessary that only sharp peaks be measured in order to make an effective log. A log will provide valuable information no matter how the energy spectrum is divided. Measurements with a plurality of detectors having different spectral sensitivity is within the scope of this invention.

Although a radium beryllium source of neutrons has been indicated as useful, other neutron sources also have utility. A characteristic of alpha-beryllium neutron sources, such as the radium beryllium source, is that the reaction of beryllium and alpha particles to produce neutrons simultaneously produces carbon which may be left in an excited state which subsequently decays to the ground state with emission of a gamma ray which is identical in energy with that produced by the inelastic scattering of neutrons by carbon. Although shielding of the source will reduce the number of such gamma rays, the most elegant way to remove the possible ambiguity of carbon detecting schemes due to this cause would be to employ a different reaction as a source of neutrons—e.g., the D-T reaction. Apparatus for utilizing this reaction of deuterium and tritium to produce neutrons of about 14 mev. energy for well logging is disclosed in Patent No. 2,689,918 for Static Atmosphere Ion Accelerator for Well Logging, issued September 21, 1954, to Arthur H. Youmans, and Patent No. 2,712,081 for Method for Neutron Well Logging, issued June 28, 1955, to Robert E. Fearon and Jean M. Thayer.

It is necessary, of course, that the source be physically close to the detector since the significant inelastic collisions will occur before the neutrons are degraded much in energy. For example, the 4.4 mev. level of carbon requires a neutron having energy 4.4 mev. in the center of mass system. Neutrons of lower energy cannot excite this level.

Therefore, the primary object of this invention is to provide a method and apparatus for identifying the elements in the strata surrounding a drill hole. Another object is to provide a method and apparatus for making a spectral analysis of gamma rays detected in neutron well logging. A further object of this invention is to provide a well logging system whereby the spectral distribution of gamma radiation impinging upon one or more detectors may be measured. Another object is to provide such a system with detectors of the scintillation counter type. Still another object is to provide a plurality of radiation detectors of different sensitivities in order to detect selectively gamma rays of different energies. Other objects and advantages of the present invention will become apparent from the following detailed description when considered with the accompanying drawings, in which:

FIGURE 1 is a diagrammatic illustration of a radioactivity well logging operation;

FIGURE 2 is a vertical sectional view of one form of the subsurface instrument using a single scintillation counter;

FIGURE 3 is a vertical sectional view of a modified form of the subsurface instrument utilizing a pair of scintillation counters;

FIGURE 4 is a diagrammatic illustration of a modified form of the surface apparatus; and FIGURE 5 is a vertical sectional view of a further modification of the subsurface equipment wherein one of a pair of scintillation counters is shielded.

Referring to the drawings in detail, particularly FIGURE 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Cable 13 suspends the instrument in the well and contains the required conductors for electrically connecting the instrument with surface apparatus. The cable is wound on or unwound from drum 14 in raising and lowering instrument 12 to traverse the well.

As shown in FIGURE 2, the subsurface instrument 12 comprises a housing 15 which encloses a neutron source 16 and a scintillation counter 17. If neutron source 16 emits gamma rays as well as neutrons, it will be desirable to enclose source 16 in a high density gamma ray absorber 18. Absorber 18 may be formed of tungsten, lead, or any other high density material. It will also be desirable to interpose between the radiation source 16 and detector 17 a neutron absorbing shield 19 which may be a hydrogenous material such as paraffin. Scintillation counter 17 comprises a crystal 20 and a photomultiplier 21. In making a radioactivity well log with this apparatus, instrument 12 is caused to traverse the formations penetrated by the well, whereby the formations are irradiated with neutrons from source 16. Neutrons from source 16 which are captures or inelastically scattered in the formations produce gamma rays which return from the formations to crystal 20. The energies of these gamma rays are indicative of the elements in the formations from which they arise. The crystal responds to the radiation by producing photons of light which are transmitted through the crystal to photomultiplier 21. For each gamma ray detected, the number of photons produced in the crystal and transmitted to the photomultiplier is proportional to the energy of the impinging gamma ray. Photomultiplier 21 converts these photons of light into electrons which are multiplied in the electron-multiplier section of the photomultiplier to produce pulses of magnitude proportional to the number of photons of light which reach its photocathde from the crystal, and the resulting current pulses are transmitted through conductors 22 to amplifier 23. The amplified pulses are then conducted through conductors 24 and cable 13 to the surface. Photomultiplier 21 is provided with power by a power supply 25 through conductors 26. Amplifier 23 is provided with power by a power supply 27 through conductors 28. Although illustrated as a rectangle in the drawing, photomultiplier 21 is to be understood to include the necessary voltage divider and electric circuits for applying the required potentials to it. Additionally, it is to be understood that the power supplies 25 and 27 may be replaced by suitable transformers and rectifiers which may be supplied with power through the cable 13 from the surface of the earth.

Through slip rings 29 and brushes 30 at the end of the drum, the conductors in the cable are electrically connected to amplifier 31 which is in turn connected to multichannel pulse selector 32. Multichannel pulse selector 32 sorts the signal pulses applied thereto into groups of pulses according to pulse energy. Each channel of pulses of a particular energy group is separately connected through one of shapers 33 to one of pulse rate conversion circuits 34. Shapers 33 shape the pulses so that each pulse has the same effect as any other upon pulse rate conversion circuits 34. Pulse rate conversion circuits 34 function in a conventional manner to produce direct-current voltages that vary in magnitude in accordance with the rate of occurrence of pulses fed to it. These direct-current voltages are a measure of the number of pulses in each channel. The direct-current voltage of each channel is separately recorded by recorder 35. Recorder 35 is driven through a transmission 36 by measuring reel 37 over which cable 13 is drawn so that recorder 35 moves in correlation with depth as instrument 12 traverses the well.

Although in FIGURE 1, a single channel from the drum to the multichannel pulse selector is shown, it is obvious that as many channels as are necessary for a particular operation may be used. Also, although three channels are shown from the multichannel pulse selector to the recorder as many channels as are necessary may be used. It is to be understood that power for the above mentioned apparatus shown schematically is to be furnished in a conventional manner by power supplies not shown.

In order that the log made by the use of the instant invention may be indicative of the atomic composition of material around the borehole, the multichannel pulse selector 32 must be carefully adjusted in accordance with empirical determinations. Since the detector sensitivity, the gain of the amplifiers, and losses in the line cannot be determined beforehand, empirical measurements are necessary to determine what pulse height corresponds to a particular element in the formations. In order to identify non-capturing elements and elements which capture slow neutrons very poorly, such as carbon, oxygen, silicon, and aluminum, detector 17 is placed as close to the source 16 as is possible without undue gamma-ray background from the source in order that fast neutrons from source 16 may strike nuclei in the nearby formations and be inelastically scattered, thereby exciting the struck nuclei and thus producing, subsequently, gamma ray emission characteristic of the struck nuclei. The detector 17 must be close to the source 16 in order that the neutrons not be appreciably slowed down before they reach the formations in the vicinity of the detector. Multichannel pulse selector 32 is adjusted to sort the pulses so that the pulses introduced into each channel are indicative of a particular element that inelastically scatters fast neutrons. With close spacing, detector 17 will also detect gamma rays emitted by nuclei which have captured neutrons emitted from source 16 and slowed down. Multichannel pulse selector 32 may be adjusted to identify selectively gamma rays produced by particular elements whether as a result of capture or of inelastic scattering or with the close spacing the pulse selector may be adjusted to disregard pulses resulting from neutron capture. When it is desired to detect elements which capture slow neutrons, it is preferable to have detector 17 spaced such a distance from the source 16 that few fast neutrons penetrate to the formations in the vicinity of the detector. In such a case, the gamma-ray spectrum is not confused by gamma rays produced by inelastic scattering and, consequently, gamma rays from capture by a particular element are more easily identified. Particular capturing elements which may be identified in this manner are hydrogen, chlorine, iron, calcium, magnesium, potassium, sulphur, and titanium. In order to interpret the logs quantitatively it is desirable to determine the neutron flux density. The fast neutron flux density near the source should remain relatively constant since the source emits a constant flux, but slow neutron flux density depends upon the formations and, therefore, must be measured. This may be done by using a crystal detector sensitive to neutrons such as a boron-coated crystal or a crystal of lithium iodide suitably activated. The pulses due to neutrons have a characteristic pulse height distribution which permits multichannel pulse selector 32 to select pulses due to neutrons for one of the channels, the output of which is to be recorded by recorder 35. Utilization of the log of slow neutron flux density permits normalization of the gamma ray logs, i.e., permits the logs to be interpreted as though neutron flux density remained constant. Alternatively, the neutron density signal may be electrically combined with each gamma-ray signal so that normalized logs may be recorded directly. The measurement of neutron density may be made by a separate neutron-sensitive detector with separate conductors to conduct the signal to the surface and a separate channel at the surface.

In FIGURE 3 there is illustrated a form of the invention wherein two detectors are used, one near the source and one at some distance, in order to detect gamma rays of inelastic scattering and gamma rays of capture, respectively. Use of two detectors permits isolation of gamma rays of capture and gamma rays of inelastic scattering but at the same time permits both measurements to be made in a single well logging operation. In FIGURE 3 the near detector is identified by reference characters used in FIGURE 2 wherein only one detector was used. The distant detector 38 comprises crystal 39 and photomultiplier 40. The output of photomultiplier 40 is applied through conductors 41 to amplifier 42 where it is amplified and sent to the surface through conductors 43. Power is supplied to photomultiplier 40 by power supply 25 through conductors 44. Power is supplied to amplifier 42 by power supply 27 through conductors 45. Each detector in FIGURE 3 operates as the detector shown in FIGURE 2, the far detector 38 being spaced far enough from source 16 that it detects almost exclusively gamma rays resulting from slow neutron capture in the formations in the vicinity of detector 38. The close detector 17 detects both gamma rays of inelastic scattering and gamma rays of capture but multichannel pulse selector 18 may be adjusted so that the signals from near detector 17 identify the elements which inelastically scatter neutrons. Two separate signals are sent to the surface through cable 13 and two channels are necessary on the surface; thus, there must be two amplifiers 31 and two multichannel pulse selectors 32 operating as described above.

As mentioned above, the precise identification of elements by dividing the gamma-ray spectrum to isolate peaks in the spectrum due to particular elements is not always easy or even possible because of the smearing of peaks by scattering of gamma rays before detection, because of the peaks introduced by the different reactions of gamma rays in the crystal and because of the great multiplicity of peaks. However, any division of the spectrum will provide valuable information, for one may identify formations by comparing logs of different parts of the spectrum. That is, it may be empirically determined that certain types of formations produce high energy gamma rays while certain other types produce low energy gamma rays. Other formations may produce gamma rays of intermediate energy. Consequently, any division of the spectrum will permit some identification of the formations, for when the gamma rays lie particularly in one part of the spectrum, certain formations are indicated. Such a division of the spectrum may be accomplished by adjusting multichannel pulse selector 18 to divide the spectrum into two or more parts. Alternatively, a plurality of detectors having different spectral sensitivity may be used to divide the spectrum. In particular, the form of the invention shown in FIGURE 3 may be used to divide the spectrum into two parts without the use of a multichannel pulse selector. The surface equipment for this form of the invention is shown in FIGURE 4. The pulses from detector 38 are amplified on the surface by amplifier 46, shaped by shaper 47, and converted to a direct-current voltage by a pulse rate conversion circuit 48 and recorded on recorder 35. Using the form of the invention described in FIGURES 3 and 4, the gamma-ray spectrum for the two detectors is different because the far detector detects only gamma rays resulting from neutron capture, whereas the near detector additionally detects gamma rays resulting from inelastic scattering of neutrons. The gamma-ray spectrum may be broken into two parts by surrounding one of two detectors of the same spectral sensitivity with a shield, such as lead, so that the spectral distribution of gamma rays reaching one of the detectors will be altered. In the case of lead, very high and very low energy gamma rays are filtered out in a greater proportion than gamma rays of intermediate energy. This form of the invention uses the surface equipment shown in FIGURE 4, and subsurface equipment as shown in FIGURE 5. Scintillation counters 17 and 38 may be spaced the same distance from the source of neutrons 16. Crystal 38 has a shield 49 of lead or some other material which will change the spectral distribution of gamma rays reaching crystal 39. An alternative to shielding one of the detectors is to make detectors of different spectral sensitivity. This may be done by placing thin coatings on identical crystals, coating one crystal with a heavy metal and the other with a light metal. Alternatively, counters may be given different spectral sensitivity by having one crystal contain heavy elements and the other crystal contain only light elements. Crystals containing heavy elements are: Cadmium tungstate, calcium tungstate, and thallium activated sodium iodide. Hydrocarbon crystals contain only light elements. Hydrocarbon liquids may also be used for the scintillation medium containing only light elements. All of these forms of the invention using detectors of different spectral sensitivity divide the spectrum into as many parts as there are detectors of different sensitivity. Comparison of the logs made by each detector identifies the formations surrounding a drill hole.

It is to be understood that independent signals may be transmitted to the surface on a single conductor by providing suitably isolated channels. It is to be further understood that pulse sorting may be performed in the subsurface equipment.

As noted above, the neutron source 16 may be a radium-beryllium source or a neutron source producing neutrons of about 14 m.e.v. by the reaction of deuterium and tritium as disclosed in the above-mentioned Patents 2,689,918 and 2,712,081.

It is also to be understood that this invention is not to be limited to the specific modifications described, but is to be limited only by the following claims:

I claim:
1. The method of determining concentrations of a selected element in formations adjacent a bore hole which comprises generating neutrons of energy of about 14 m.e.v. at spaced locations along said bore by accelerating deuterium ions onto tritium atoms to effect gamma-free production of said neutrons, at each of said locations detecting the component of prompt gamma radiation produced by inelastic scattering of said neutron radiation within a restricted energy band including a selected characteristic energy level, and recording said component on a space scale proportional to the distances between said locations.

2. The method of determining concentrations of a selected element in formations adjacent a bore hole which comprises generating neutrons of energy of about 14 m.e.v. at spaced locations along said bore by accelerating deuterium ions onto tritium atoms to effect gamma-free production of said neutrons, at each of said locations detecting the component of prompt gamma radiation produced by inelastic scattering of said neutron radiation within a restricted energy band including a characteristic energy level of said selected element, and recording said component on a space scale proportional to the distances between said locations.

3. The method of determining concentrations of a selected element in formations adjacent a bore hole which comprises generating neutrons of energy of about 14 m.e.v. at spaced locations along said bore by producing nuclear reactions between deuterium and tritium to effect gamma-free production of said neutrons, at each of said locations detecting the component of prompt gamma radiation produced by inelastic scattering of said neutron radiation within a restricted energy band including a characteristic energy level of said selected element, and recording said component on a space scale proportional to the distances between said locations.

4. The method of determining concentrations of a selected element of the class consisting of oxygen and carbon in formations adjacent a drill hole which comprises generating neutrons of energy of about 14 m.e.v. by accelerating deuterium ions onto tritium atoms to effect gamma-free production of said neutrons, irradiating formations along said drill hole with said neutrons to excite a characteristic energy level of the selected element by inelastic scattering, selectively detecting the component of prompt gamma radiation produced by said neutrons within a restricted energy band including said characteristic energy level, and recording said component as a function of bore hole depth.

5. A system for determining concentrations of a selected element of the class consisting of oxygen and carbon of earth formations adjacent a bore hole which comprises a D-T source of high energy neutrons having energies of 14 m.e.v. to include the characteristic nuclear energy level of the selected element, means for traversing said bore hole with said source to irradiate said formations and excite the energy level of said element by inelastic scattering, a detector supported and movable with said source for producing an output signal dependent upon the number and amplitude of prompt gamma rays impinging said detector, and differential means for recording the component of said signal dependent upon the number of gamma rays within a restricted window which includes said characteristic energy level in the amplitude spectrum of said gamma rays.

6. The method of determining concentrations of a selected element of the class consisting of elements that inelastically scatter neutrons in formations adjacent a drill hole which comprises generating neutrons of energy of about 14 m.e.v. by accelerating deuterium ions onto tritium atoms to effect gamma-free production of said neutrons, irradiating formations along said drill hole with said neutrons to excite a characteristic energy level of the selected element by inelastic scattering, selectively detecting the component of prompt gamma radiation produced by said neutrons within a restricted energy band including said characteristic energy level, and recording said component as a function of bore hole depth.

7. A system for determining concentrations of a selected element of the class consisting of elements that inelastically scatter neutrons of earth formations adjacent a bore hole which comprises a D-T source of high energy neutrons having energies of 14 m.e.v. to include the characteristic nuclear energy level of the selected element, means for traversing said bore hole with said source to irradiate said formations and excite the energy level of said element by inelastic scattering, a detector supported and movable with said source for producing an output signal dependent upon the number and amplitude of prompt gamma rays impinging said detector, and differential means for recording the component of said signal dependent upon the number of gamma rays within a restricted window which includes said characteristic energy level in the amplitude spectrum of said gamma rays.

References Cited by the Examiner

UNITED STATES PATENTS

| | | | |
|---|---|---|---|
| 2,469,460 | 5/1949 | Fearon | 250—83.6 |
| 2,712,081 | 6/1955 | Fearon et al. | 250—83.6 |
| 2,905,826 | 9/1959 | Bonner et al. | 250—83.6 |

RALPH G. NILSON, *Primary Examiner.*

A. R. BORCHELT, *Assistant Examiner.*